United States Patent Office 3,528,734
Patented Sept. 15, 1970

3,528,734
PORTABLE AUDIO-VISUAL REPRODUCTION
APPARATUS
Jean Bruel, Bateaux Mouches, Port de la Conference, Paris, France, and Guy Marchand, 32 Rue Pasteur, 91 Ste. Genevieve des Bois, France
Filed Feb. 21, 1967, Ser. No. 617,518
Claims priority, application France, Feb. 24, 1966, 50,971; Feb. 13, 1967, 94,702, 94,703, 94,704
Int. Cl. G03b 31/00
U.S. Cl. 353—15
13 Claims

ABSTRACT OF THE DISCLOSURE

An audio-visual playback apparatus is small, portable, and has separate casings for the audio and visual portions. The audio portion plays a tape which has sound recording on one side and a printed text on the other side. The sound record is read by a read head and the printed text is optically transmitted for viewing from outside the casing. The visual portion steps a microfilm past an optical projection system for simultaneous viewing but may be separated from the audio portion. The portable device may be suspended from the neck of a user and the sound of the audio portion conducted to an earpiece while the text of the audio portion may be optically transmitted by fiber optics to eyeglasses of the user.

This invention relates to a small, portable audio-visual reproduction of playback apparatus, so constructed as to make it possible, on the one hand, to listen to a recorded text and, simultaneously, to read that text from a tape which has, on one side, a recording and on its other side printed characters and, on the other hand, images illustrating this text may be viewed with the aid of a microfilm.

Audio-visual playback units are known which combine the playback of sounds with the help of disks and the projection of images upon a screen which is either incorporated into these units or which is at some distance from these units. These playback units are generally very large in size, they are very difficult to move, and they contain some very complicated electrical equipment, which makes them fragile and very expensive.

This invention is intended to eliminate the disadvantages inherent in these known units and to create a portable audio-visual playback apparatus which is simple in construction, which is easy to produce, and which, for example could meet the requirements arising out of the expansion and development of knowledge by means ol an audio-visual procedure.

One of the most important objects of this invention is to provide such an apparatus which would be light, easy to handle, and portable: in other words, an apparatus which would operate either autonomously or completely independently but which could be combined with complementary units, such as supports for the prerecorded magnetic tapes, tapes prerecorded on one side and imprinted upon the other side, as wel as microfilm.

Another objective of this invention is to provide a playback unit which could be used by one user or a group of users either simply as a device for listening to recorded text or as a unit for reading to printed texts, or perhaps an image viewing apparatus, or an apparatus combining the three preceding arrangements.

The audio-visual playback unit, of this invention, is characterized by the fact that it involves two connected cases; one of these cases contains an arrangement of the "audio" section of the apparatus which reproduces the recording of a text and which also reproduces the legible image of that text on the basis of a tape recorded on one side and printed on its other side; the other case contains the devices for the "visual" section of the apparatus which projects—with the help of a microfilm—images illustrating the text recorded upon the above mentioned tape; the "audio" section includes a device which controls the movement of the tape and which has a tape feeder, an elastic locking device which keeps the loader in place, a guide track involving a straight-line portion for the unwinding of the tape, an optical system arranged opposite the straight portion of the guide track for reproducing the image of the imprinted text, a reading head which reads the recorded text, a capstan which keeps the tape moving, a motor which causes the rotation of an inertial flywheel of the capstan by means of a transmission, a sound amplifier circuit connected to the reading head and supplying a sound pickup, a system for listening to the recorded text, connected in with the previously mentioned sound pickup, an electrical device controlling the motor, two power buttons which furnish the "START" and "STOP" impulses for the motor which, in turn, may be stopped by the passage—across the reading head—of a "period of silence" or dead time which may have been recorded on the tape, and an electric current supply battery; this "visual" section also includes a device which controls frame-by-frame movement of the microfilm, in synchronization with the movement of the microfilm of the tape and made up of a microfilm feeder, a device controlling the movement of the microfilm, a light source for the projection of the images of this microfilm, an optical system arranged opposite the light source and receiving the images projected, a microfilm receiver reel which is rotated in synchronization with the movement of the microfilm, an electrical device controlling the microfilm movement device, an electric power supply battery. The "audio" and "visual" sections are constructed to operate independently of each other and they can be disconnected.

According to various embodiments of the audio-visual playback apparatus, the component parts of the "audio" and "visual" sections—such as the optical systems, the system for listening to the recorded text, the tape and microfilm loaders, and the tape guide track—are designed differently.

The optical system of the "audio" section is either in the form of a magnifying screen, such as a magnifying lens, inserted in the wall of the case, or it is made up of a conductor consisting of many optical fibers which carry the image of the recorded text between an object situated on the screen and connected to one of its ends, and an eye piece connected to its other end and fixed in position in the field of vision of a user on one lens of a pair of lenses worn by the user. The optical system of the "visual" section is either in the form of a screen incorporated into one wall of the case, on which the enlarged microfilm images appear, or in the form of a projection objective lens, projecting the enlarged images upon a screen at some distances from the apparatus, or in the form of a device with optical fibers, similar to the one in the "audio" section, whose eye piece, however, is fixed in position in the field of vision of the user, on the other lens. The system for listening to the recorded text is designed either in the form of an ear listening device, or in the form of an osseous conduction, carried by one of the temples of eyeglasses worn by the user; this listening device or this osseous conduction device are connected to the sound pickup of the apparatus. The tape or microfilm loaders are designed either in the form of a reel, or in the form of a clip containing two superposed reels, one payout reel and one receiving reel, the clip revealing, on the one hand, on its periphery, a guide track in which the tape or the microfilm circulate from one reel to the other, and, on the other hand, a recess for positioning the reading head of the tape or the light source for the projection of the microfilm, as well as a recess for the placement of a feed roller of the receiving reel. The guide track of the tape is designed—in case a simple, reel is used—in the form of a guide having a central, straight-line portion opposite the optical system and arc-shaped portions at the end, revealing, respectively, an engaging device for the free end of the tape and a feeding device for moving the tape along, with the reading head in immediate proximity, looking upward; in case a loader with two superposed reels is used, the guide track in the respective arrangement of the section chosen here, is eliminated because it is included on the contour of the previously mentioned loader clip.

Other features of the invention will be pointed out in the following description and claims and illustrated in the accompanying drawings, which disclose, by way of example, the principle of the invention and the best mode which has been contemplated of applying that principle.

Figure 1:
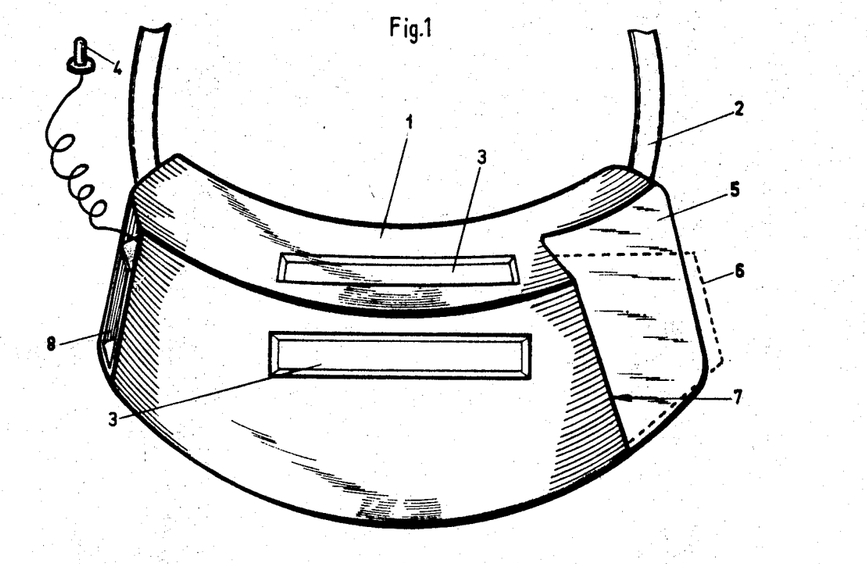
FIG. 1 is a perspective view which shows the case for the "audio" section in the first version of the apparatus of this invention.

In FIG. 1, shows a case 1 for the "audio" section of the "audio-visual" playback device, this case has the shape of an ornamental throat plate and may be suspended from a strap 2 around the neck of the user. Depending upon the wish of the user, it can obviously also be carried by hand or it can be placed on a support. On its front side there is an elongated screen 3 on which a legible text, corresponding to the text listened to by means of an ear listening device 4, moves past. On the upper face, a window 3' is provided so as to constitute a passage for the projection of the text read off on screen 3 toward the overhead screen which is provided in the case the "visual" section is connected to the case of the "audio" section. In the right hand portion of case 1, notch 5 is provided so as to permit the insertion of a loader 6, of the recorded and printed tape, into an opening 7. In the left-hand portion of case 1, an opening 8 is provided for the removal of the tape.

Figure 2:
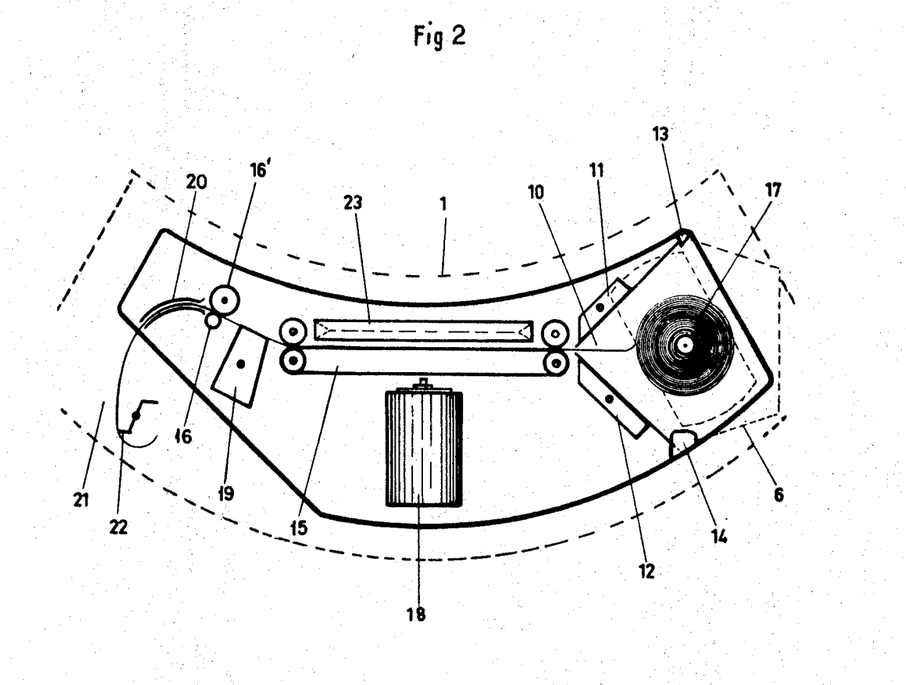
FIG. 2 is a schematic sectional plan view of the interior layout and arrangement of the "audio" case shown in FIG. 1.

FIG. 2 is a schematic diagram of the means for driving the tape and the means for reading the tape, arranged inside case 1, on support plate 9. On that plate 9, is an angular inlet, with stops 11 and 12, intended to receive a loader 6 which shall be kept in position by elastic retaining ribs 13 and 14. A band moving device 15 is provided so as to move tape 17 along, in synchronization with a feed roll 16 opposite roll 16'. This device is driven by a motor 18, controlled by a starter button (not shown). Between the driving device 15 and the drive roll 16, a reading head 19 is provided to decode the tape. After it has passed through between drive roll 16 and counter-roll 16', the tape, by means of channel 20, is moved either into a chamber 21, where it is reeled up by a spindle 22, or toward opening 8, which is the outlet opening. The spindle 22 may be replaced with a reel, a driven reel, which makes it possible to rewind the tape and therefore to recover the tape. In FIG. 2, case 1 is shown in a broken line, so as to indicate the position of the driving means and the reader inside it. Above device 15, which drives the tape, a lens 23 in a prismatic form, is provided to facilitate the reading of the characters, symbols, or drawings represented on the face of the tape opposite the recorded face. Note that, in order to make these characters, symbols, or drawings legible by means of the prismatic lens 23, the tape is laterally illuminated by means of a lighting device (not shown).

Figure 3:
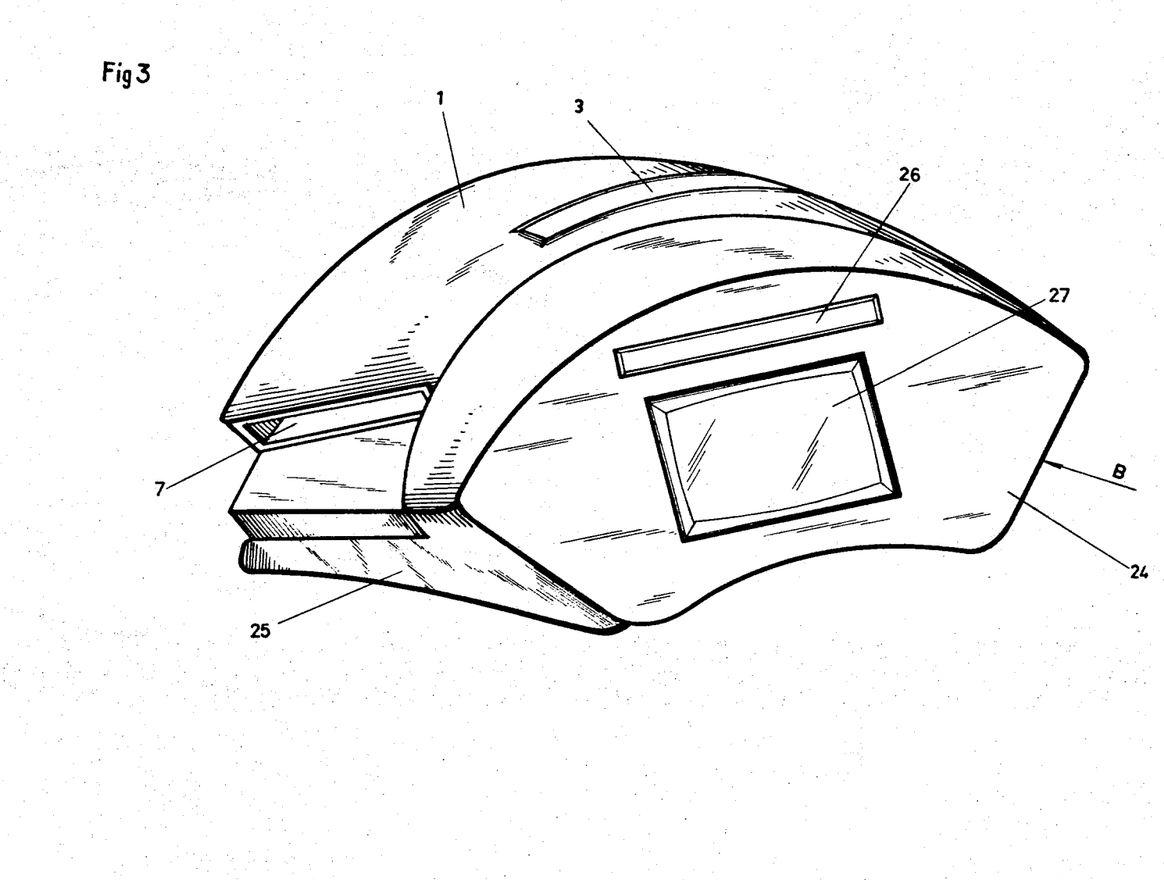
FIG. 3 is an overall perspective view of the first example of this apparatus, with the cases for the "audio" and "visual" sections connected.

FIG. 3 shows case 1 of the "audio" section connected to case 24 with support base 25 of the visual section, and note the arrangement provided in order to permit the introduction of the tape loader through opening 7. On the front side of case 24 is a long screen 26, called the overtilting screen which faithfully reproduces the characters, symbols, or graphic shapes passing by in front of the upper creen 3. Below screen 26, another screen 27 enables one to view the images or illustrations of the text listened to. Inside case 24, is ‧ device for the "frame-by-frame" movement and projection of the images of a microfilm, similar to the kind shown in case 1. The microfilm destined for this "visual" section is in the form of a loader; the latter may be inserted in an opening not shown here and located on face B; in all cases, this microfilm is recoverable and is reeled up on a reel as shown in FIG. 5.

In this audio-visual playback apparatus, on the one hand, the sound is transmitted to the user, either by means of ear listening device 4, or by means of a bone conduction unit; this sound is supported by a direct reading of the recorded text which is made visible by means of screen 26; the user makes the transposition by combining what he hears and what he sees; and, on the other hand, the user is provided, by means of screen 27, with an image illustration of the text read and heard, as the microfilm runs off in synchronization with the tape which is recorded on one side and printed upon the other.

Figure 4:
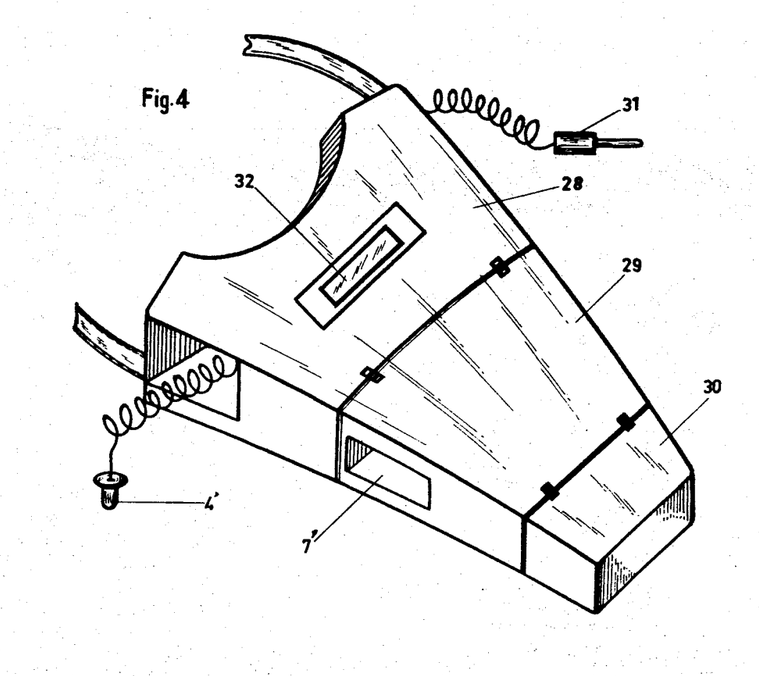
FIG. 4 is a perspective view of a second version of the apparatus covered by this invention.
Figure 5:
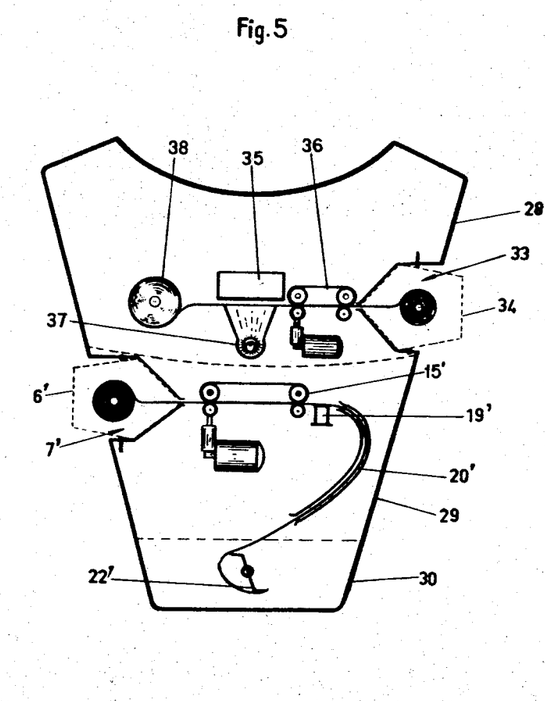
FIG. 5 is a longitudinal section of the apparatus shown in FIG. 4.

In FIGS. 4 and 5, which illustrate a second embodiment of this audio-visual playback apparatus, we note that the arrangement of the cases for the "audio" and "visual" sections is reversed, as compared to the embodiment of FIG. 3. The upper case 28 contains the "visual" section whereas lower case 29 contains the "audio" or tape reading section; a third case 30 is provided to receive that tape when it is read. Coming out of the upper portion of case 28, is an ear phone 4' and jack 31; this jack is intended to be connected with a sound amplifier device. On the front side of case 28, a screen 32 permits the viewing of the images illustrating the text which is heard; this screen can be replaced with a projection lens, enabling the user to detail the images or to read the explanatory subtitles projected upon a screen at some distance or upon a rear-view mirror.

In FIG. 5, arrangements for the internal components of cases 28, 29 and 30 are shown. In case 28 there are a means 36 for driving the microfilm which is taken over from a loader 34, inserted in an opening 33; a lighting means 37 which transmits the images by means of transparence, with or without subtitles, upon an inclined screen or mirror 35, coordinated with screen 32; a reel 38 synchronized with driving device 36 and rewinding the microfilm so as to permit its reuse. In lower case 29, there is a driving device 15' and a reading device 19' for the tape, similar to that shown in FIG. 2 (for the definition of the component parts of the device, we refer to the description of FIG. 2, the reference numerals indicated here being similar but bearing the prime symbol). It is understood that, as in the apparatus shown in FIG. 3, the microfilm of the "visual" section 28 runs off in synchronization with the movement of the tape of "audio" section 29.

Figure 6:
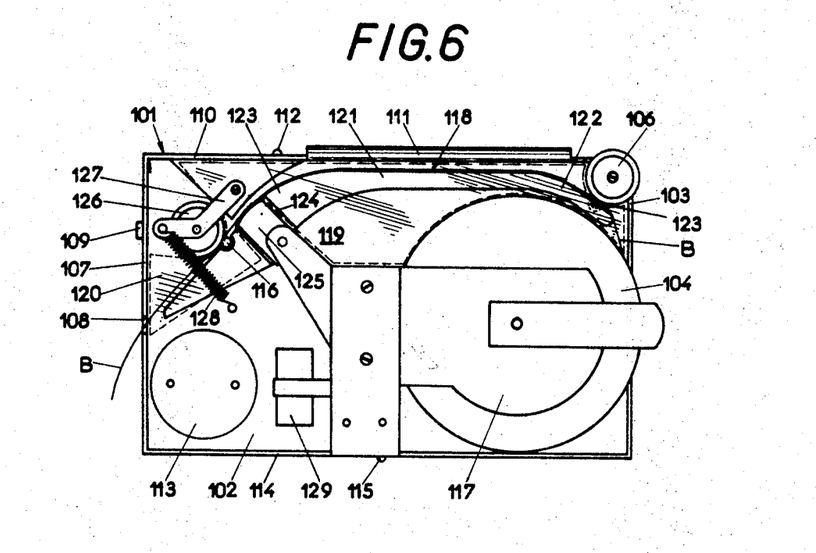
FIG. 6 is a plan view of the upper chamber of the case of the "audio" section in a third posisble version of the audio-visual playback apparatus involved in this invention.
Figure 7:
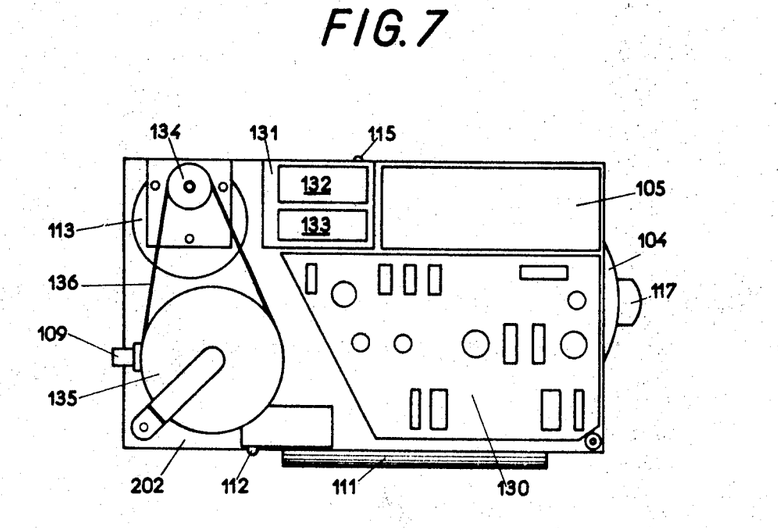
FIG. 7 is a view, from below, of the inside support plate in the case shown in FIG. 6, dividing the latter into two chambers, an upper chamber and a lower chamber.

FIGS. 6 and 7 show a third possible version of the "audio" section of an audio-visual playback apparatus. In this arrangement the component parts of the "audio" section are in a parallelepiped case 101 with a rectangular base, which is divided inside into two chambers, an upper one and a lower one, by a support plate 102, arranged parallel to the base and supporting the previously mentioned parts. In one of the end walls 103 of the case, there is an opening which permits the engagement of a loader clip of reel 104 carrying tape which is recorded on one side and printed on the other side, as well as an opening for the engagement of a battery 105 or power supply for the apparatus. A hole cut at an angle reveals an elastic roller 106 which is moved manually so as to engage the free end of tape B. In the wall at the opposite end of the case there is a slit 108 which enables tape B to pay out, and nearby there is a socket 109 for the jack of a listening system. On one of the side walls 110, there is an enlarging optical system 111, such as, for example, an elongated lens, making it possible to read the text printed upon tape B, and nearby there is an opening for push button 112 for the switch that stops motor 113 of the apparatus. On side wall 114, there is an opening for push button 115 for the starter switch of motor 113, which drives capstan 116, controlling the movement of the tape.

In FIG. 6, the following are arranged in the upper chamber of the case and on the support plate: A device 117 for the elastic engagement and positioning of reel 104 for the tape; a guide track 118 for the movement of tape B, covered by transparent plates 119 and 120 (shown in broken lines) for holding the tape in that track 118 and situated longitudinally and parallel to the optical system 111. The guide track includes a guide 121, having, on the side of the tape input, a funnel-shaped part 122 on which is located a pin 123 facing roller 106 which has a surface of resilient material, operated manually so as to engage the free end of the tape between the latter and the above mentioned pin. At the "tape output" end of the guide 121 is an arched shape 123 including a groove 124 for a sound reading head 125 and, near the head, in a notch of the guide, is an axle 116, forming a capstan for the purpose of driving the tape, against which is supported an elastic pressure roller 126, mounted on pivoting arm 127, and biased by a tension spring 128. A smoothing capacitor 129 for drive motor 113 of the apparatus is in the upper chamber as is the push button switch 115 for starting the motor, and rear portion of the motor 113 which is located on the support plate near the tape guide and to the side of the latter opposite the elastic pressure roller 126.

FIG. 7 shows the lower chamber of the case under the support plate 102 and shows a printed amplifier circuit 130, an automatic "stop" relay 131 for the movement of the tape, responding to a silent period or dead time which may be found in the recording on the tape; two smoothing capacitors 132 and 133 for the motor; the motor 113, having on its drive shaft a pulley 134; the flywheel 135 of the capstan, connected by a transmission belt 136 to the pulley 134; and the motor stopping switch 112. In a lateral emplacement in the corner and on the base of the case there is the power supply battery 105 for the apparatus.

This "audio" section operates as follows: In the case, a reel 104 having a tape pre-recorded on one side and imprinted on the other side, the imprinted side being the one facing toward the outside of the case is inserted. The free end of the tape is guided in the funnel-shaped portion 122 of the guide between the pin and the elastic input roll 106, operating it manually until the end of the tape, following the guide track 118, passes behind the elongated lens 118, over the sound reading head 125, and engages at the entry of the capstan 116 and its pressure roll 126 facing it. Next the button 112 for the switch controlling the start of the motor is pushed and at that moment the tape B is placed in continuous motion. The tape will keep going either until the motor stop button 115 is pushed or in case of the passage of a "dead time" stretch recorded on the tape; in this latter case, the tape will be automatically started up again by an impulse to the motor starter switch.

Figure 8:
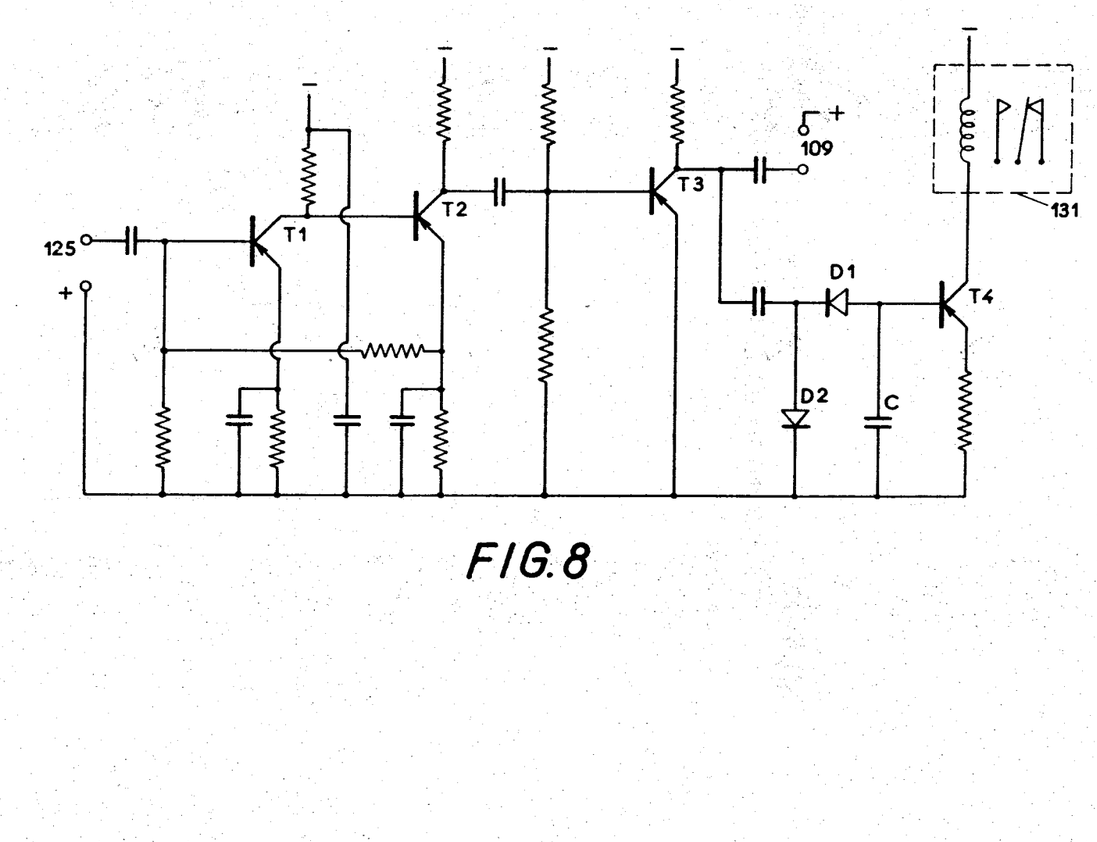
FIG. 8 is an amplifier circuit diagram for amplifying the sound represented in the form of a printed circuit in FIG. 2.

In FIG. 8, which shows the sound amplifier circuit diagram, note that the circuit connected to sound reading head 125 has three amplifier transistors T1–T2–T3, before ear phone socket 109, and a transistor T4 whose base is polarized by two diodes D1 and D2, which controls relay 31. Transistor T4 and diodes D1 and D2 control the automatic stopping of the movement of the tape when there is a "dead time" of more than 3 seconds. This relay remains on "hold" because of the current from transistor T4, the time constant of 3 seconds here being maintained and regulated by capacitance C.

In the "audio" section described, a simple reel is used as the tape charger. This tape is fed out through a slit in an outside wall of the case; the apparatus is then referred to as a "lost-tape" or "paid-out tape" apparatus. In this audio section two-reel tape clips may be used, one reel from which the tape is unwound and another reel on which the tape is rewound after it has run its course, and this apparatus is then called a "recovered tape" apparatus. In that case, the arrangement described above involves a means for driving the receiving reel, and this driving means is connected to the motor by means of a differential glide transmission; in that case, likewise, the tape is released from the unwinding reel, through an opening in the upper wall of the case, so as to form a slack or loop in the tape guide track.

In this "audio" section, a tape clip with two superposed reels may be used. This loader or clip has a tape guide means on the periphery of its casing, including a groove and constituting a track in which the tape is directed from one reel to the other. In that case, the initial guide track is eliminated since there already is such a track on the periphery of the loader; the sound reading head is provided here, engaging in an opening of the casing of the clip and below the tape, that is to say, on the side of the tape's registered face; the other side, the outside face, that is, which is printed, is opposite the optical system; in that case, likewise, the device controlling the movement of the tape is combined and completed by a differential glide driving device which rotates the receiving reel of the apparatus.

Figure 9:
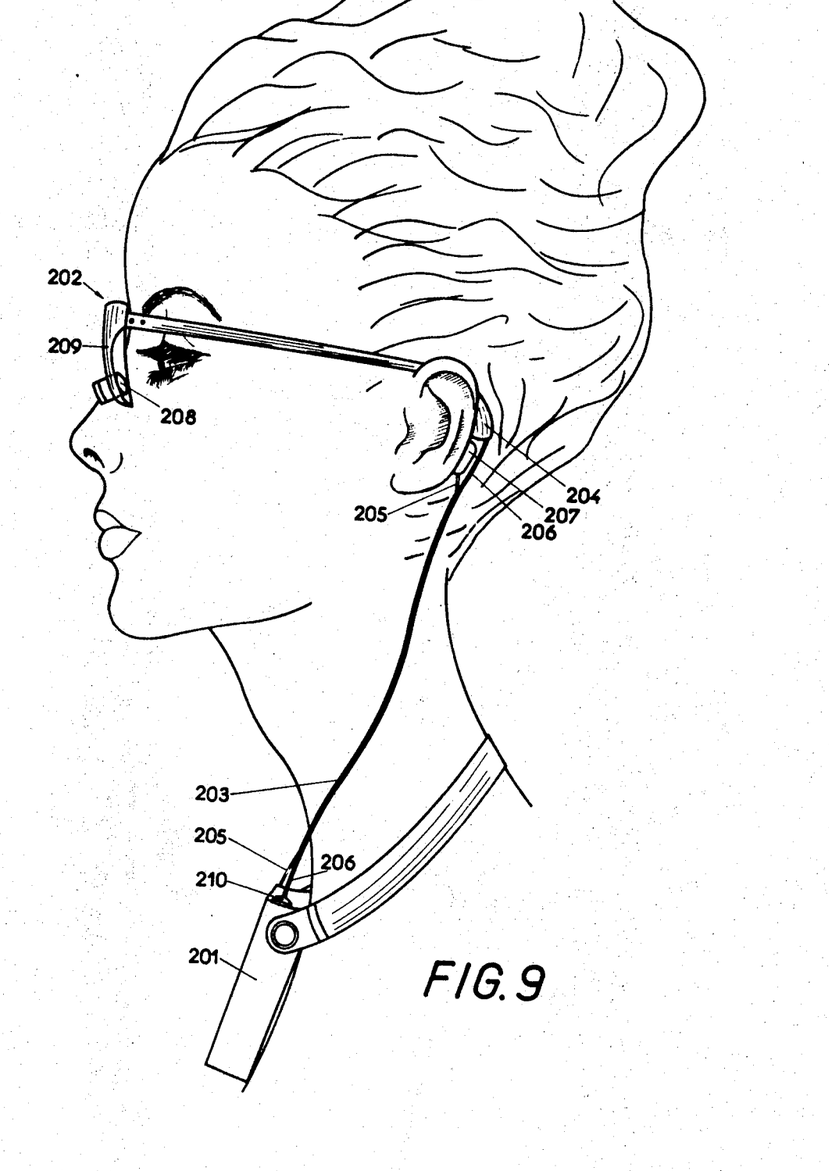
FIG. 9 is a device connected to the audio-visual playback apparatus making it possible, on the one hand, to carry the sound to the ear of a user and, on the other hand, to bring the images into the field of vision of the user.

In FIG. 9 there is an audio-visual transport device, connected to an audio-visual playback apparatus 201, used for transporting from the latter, on the one hand, the sound going to the ear of the user and, on the other hand, the images to the field of vision of the user. This device includes a sheathed conductor 203, connecting the rear end 204 of a temple of eyeglass frames 202 and involving a sound conductor 205 as well as an image conductor 206. The conductor 205 is connected at one end to a system of osseous conduction 207, supported or embedded to the rear of the temple of the glasses and it is connected at its other end to the sound socket of the apparatus 201. Conductor 206 consists of many optical fibers and is connected at one end to an eye piece 208 attached to the lens frame 209 of the glasses, whereas its other end is connected to the device 210 with the optical reading system in apparatus 201.

The conductor 206, from the rear of one of the frame temples, passes either to the inside or against that temple, in order to reach eye piece 208. The eye piece 208 is shown schematically in order to illustrate the arrangement of the device and it is made up of an optical system which is arranged in the field of vision of the user. It is so arranged as to transmit, to the eye, the images channeled by the optical fibers, and it is so installed as to permit the user an accommodation without any effort while still making it possible for him to examine his normal field of vision, and this is true regardless of whether or not he uses means for the correction or protection of his eyesight. For that purpose, for example, a sufficient vision slit containing eyepiece 208 might be placed in the lens glass of the spectacles.

Figures 10, 11, 15:
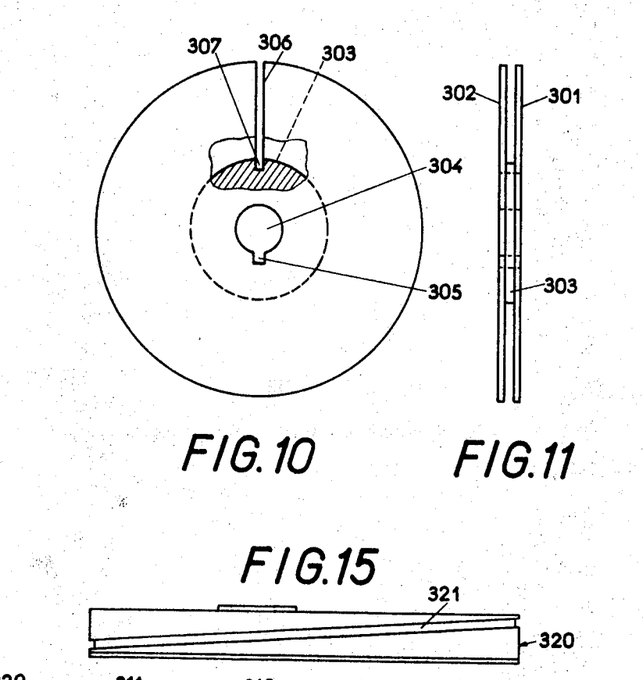
FIG. 10 is a reel constituting the tape loader for the "audio" section of the apparatus.
FIG. 11 is a view, from the left, of the reel shown in FIG. 10.
FIG. 15 is a view, from below, and in the direction of arrow F, of the loader shown in FIG. 12.
Figures 12, 13, 14:
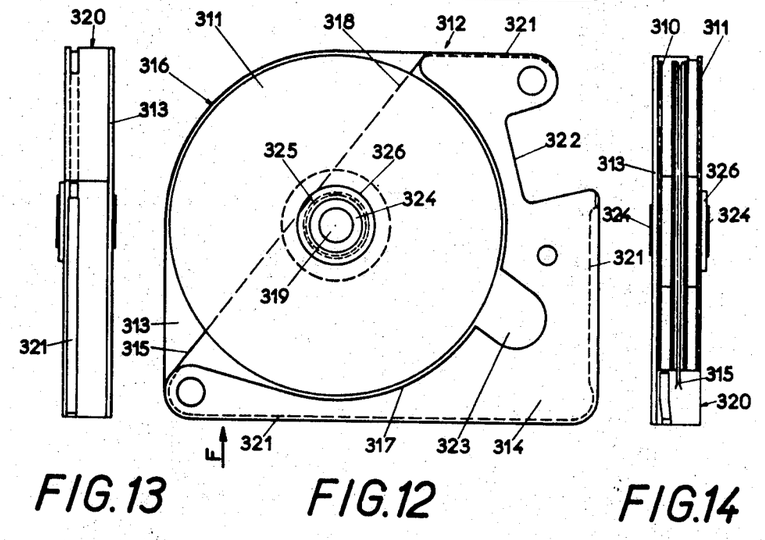
FIG. 12 is an elevation view of a tape loader with two superposed reels which can be used in the "audio" section of the apparatus.
FIG. 13 is a view, from the right, of the loader shown in FIG. 12.
FIG. 14, is a view, from the left, of the loader shown on FIG. 12.

In FIGS. 10 and 11, there is a reel constituting a tape clip; this clip is used in an audio-visual playback apparatus, involved in this invention. This reel is made of one single molded piece and features two lateral cheeks 301 and 302, situated on either side of a member 303 traversed axially by bore 304 provided with key groove 305; each cheek has a radial slot 306 and these slots are arranged opposite to each other, extend radially and their bases are connected by means of a groove 307 in the outside surface of the hub. This hub constitutes the winding core for the tape on the reel. This groove 307 on the outside of the hub constitutes the place of the attachment of the end of the tape; this attachment is performed either by means of soldering by means of a heated strip introduced into slots 306 and applying the tape upon the bottom and the sides of groove 307 or by means of an elastic member introduced into the groove and wedging the tape between its lateral and lower sides and hub 303.

In FIGS. 12–15, showing a tape clip adapted for use in a unit according to this invention, two reels 310 and 311 are arranged superposed in a casing 312, having a lateral cheek 313, a lateral surface 314 on the side opposite that cheek, and an intermediate support cheek 315, situated between and separating the two reels. This casing 312 is so designed as to present this lateral cheek 313 in the form of a rectangle with rounded corners; one of these corners essentially describes an arc 316 whose center is situated over the center of the reels and whose radius is slightly greater than the radius of the reels. The lateral surface 314 includes the lateral wall block 320, curved radially on arc 317, having the same center and the same radius as the earlier arc 316, allowing the reel 311, situated on the side corresponding to that lateral surface of the casing to appear in its entirety. The intermediate support cheek 315, in the form of a rectangular trapezoid with rounded corners, whose inclined side 318 is situated according to a chord of the outside circle of the reels and passing a short distance from the center of the reels, so as nevertheless to leave a strip of sufficient material between the bore for the passage of the reel hub and the inclined side; the two cheeks are integral with the block 320, conforming to the rectangular portion of the previously mentioned trapezoid form and hollowed-out at 317 on the inclined side so as to guide the tape and to prevent it from coming off the reels. On the peripheral surface of the block there is a helicoidal groove 321 designed to furnish a guide track for the tape, from one reel to the other. The cross bar block also has two transverse recesses, one of these recesses 322 extending radially from its periphery so as to furnish a position for the tape reading head, the other recess being in the side of the reels so as to provide a connection for a device for driving one of the reels. One of the reels 310 has a hub 324 which traverses the two cheeks 313 and 315 of the casing and is provided with a bore 319 for a tape winding drive shaft, whereas the other reel is mounted on a cylindrical hollow bearing 325 which forms one piece with the central cheek and in which passes the previously mentioned hub. This bearing is arranged so as to overhang the opposite side of the first reel. An outer-edge ring 326 is embedded between the bearing and the hub to keep the second reel 311 in place.

The first reel 310, bearing the traverse hub, furnishes the "initial winding reel" for the tape, whereas the second reel 311 furnishes the "receiving reel" for the tape; this second reel 311 is the one which is driven in the playback apparatus whereas the first reel becomes the "payout" reel and is braked in the course of unwinding or paying out.

It is obvious from the above that many variations and changes may be made in the existing device. It is the intention, however, to be limited only as indicated by the scope of the following claims.

We claim:
1. In a reproduction apparatus having audio and visual portions comprising:
  (a) a first casing for housing the audio portion of the apparatus,
  (b) a tape having a sound recording on one face and a printed text of the recording on the other face,
  (c) a holder for the tape,
  (d) tape guide means in the first casing defining a predetermined path for the tape,
  (e) drive means in the first casing for driving the tape along the predetermined path,
  (f) a sound reproduction head in the casing for reproducing the sound recorded on one face of the tape,
  (g) an optical transmission system for viewing the printed text on the other face of the tape,
  (h) a second casing separable from the first casing for housing the visual portion of the apparatus,
  (i) a step-by-step microfilm feed in the second casing, the feed being synchronized with the tape drive, and
  (j) a microfilm optical system in the second casing for viewing the microfilm image.

2. An audio visual reproduction apparatus as claimed in claim 1 wherein the optical transmission system includes a screen incorporated in the wall of the first case.

3. An audio visual reproduction apparatus as claimed in claim 1 wherein the optical transmission system in the first casing includes a fiber optic conductor extending from the casing to a lens area of eye glass frames.

4. An audio visual reproduction apparatus as claimed in claim 3 wherein the sound reproduction head in the first casing is connected to a sound conductor provided with an ear piece.

5. An audio visual reproduction apparatus as claimed in claim 4 wherein the ear piece is of the bone conduction type and is carried by a temple of the eye glass frames.

6. An audio visual reproduction apparatus as claimed in claim 1 wherein the tape holder comprises a pair of superposed reels in one housing, one reel being a pay out reel and the other reel being a take up reel.

7. An audio visual reproduction apparatus as claimed in claim 6 wherein the housing for the tape holder has a tape guide track on its periphery.

8. An audio visual reproduction apparatus as claimed in claim 1 wherein the sound reproduction head is connected to a sound amplifier circuit which is responsive to a period of silence in the sound recording.

9. An audio visual reproduction apparatus as claimed in claim 1 wherein the microfilm optical system is a projective system.

10. An audio visual reproduction apparatus as claimed in claim 1 wherein the tape drive includes a motor driven capstan and the tape guide has arcuate shaped portions sandwiching a straight portion, and wherein the optical transmission system is adjacent the straight portion.

11. The audio visual reproducing apparatus as claimed in claim 1 wherein the optical transmission system is a magnifying glass.

12. The audio visual reproducing apparatus as claimed in claim 1 wherein the microfilm optical system is a screen located on a wall in the second casing of said apparatus.

13. The audio visual reproducing apparatus of claim 1 wherein the tape holder is a simple spool.

References Cited

UNITED STATES PATENTS

| | | | |
|---|---|---|---|
| 3,208,686 | 9/1965 | Edwards et al. | 242—71.2 |
| 3,216,778 | 11/1965 | Davies et al. | 352—129 |
| 3,227,508 | 1/1966 | Bavaro | 352—27 |

NORTON ANSHER, Primary Examiner

M. H. HAYES, Assistant Examiner

U.S. Cl. X.R.

352—129